United States Patent
Park et al.

(10) Patent No.: US 11,551,866 B2
(45) Date of Patent: *Jan. 10, 2023

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Yong Park, Suwon-si (KR); Ji Hong Jo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/799,109

(22) Filed: Feb. 24, 2020

(65) Prior Publication Data

US 2020/0194176 A1 Jun. 18, 2020

Related U.S. Application Data

(63) Continuation of application No. 16/165,363, filed on Oct. 19, 2018, now Pat. No. 10,614,955.

(30) Foreign Application Priority Data

Aug. 9, 2018 (KR) .......................... 10-2018-0092772

(51) Int. Cl.
*H01G 4/008* (2006.01)
*H01G 4/30* (2006.01)
(Continued)

(52) U.S. Cl.
CPC ......... *H01G 4/0085* (2013.01); *H01G 4/1227* (2013.01); *H01G 4/30* (2013.01); *H01G 4/232* (2013.01); *H01G 4/248* (2013.01)

(58) Field of Classification Search
CPC ...... H01G 4/12; H01G 4/1209; H01G 4/0085; H01G 4/1227; H01G 4/232; H01G 4/30
(Continued)

(56) References Cited

U.S. PATENT DOCUMENTS

| | | |
|---|---|---|
| 8,971,017 B1 | 3/2015 | Nakamura |
| 9,042,082 B2 | 5/2015 | Wada et al. |

(Continued)

FOREIGN PATENT DOCUMENTS

| | | |
|---|---|---|
| CN | 103700499 A | 4/2014 |
| CN | 103871741 A | 6/2014 |

(Continued)

OTHER PUBLICATIONS

U.S. Notice of Allowance dated Nov. 26, 2019 issued in U.S. Appl. No. 16/165,363.
(Continued)

*Primary Examiner* — Arun Ramaswamy
(74) *Attorney, Agent, or Firm* — Morgan, Lewis & Bockius LLP

(57) ABSTRACT

A multilayer ceramic capacitor includes: a ceramic body including dielectric layers and having first and second surfaces opposing each other; a plurality of internal electrodes disposed in the ceramic body; and first and second side margin portions disposed on end portions of the internal electrodes exposed to the first and second surfaces, wherein the ceramic body includes an active portion, and cover portions disposed on upper and lower surfaces of the active portion, each of the first and second side margin portions is divided into a first region and a second region, each of the cover portions is divided into a first region and a second region, and contents of magnesium (Mg) contained in the second regions of the cover portions and the first and second
(Continued)

side margin portions are larger than those of magnesium (Mg) contained in the first regions thereof, respectively.

23 Claims, 7 Drawing Sheets

(51) Int. Cl.
*H01G 4/12* (2006.01)
*H01G 4/232* (2006.01)
*H01G 4/248* (2006.01)

(58) Field of Classification Search
USPC ............... 361/321.1, 301.4, 311, 321.5, 312
See application file for complete search history.

(56) References Cited

U.S. PATENT DOCUMENTS

| 9,607,763 | B2 | 3/2017 | Sasabayashi et al. |
| 9,633,788 | B2 | 4/2017 | Fukunaga et al. |
| 9,831,036 | B2* | 11/2017 | Ikeda ............... H01G 4/012 |
| 10,522,293 | B2 | 12/2019 | Sakate et al. |
| 2006/0114641 | A1 | 6/2006 | Iwasaki et al. |
| 2008/0304204 | A1 | 12/2008 | Suzuki |
| 2010/0188797 | A1 | 7/2010 | Yamazaki et al. |
| 2012/0250221 | A1 | 10/2012 | Yamashita |
| 2014/0083755 | A1 | 3/2014 | Lee et al. |
| 2014/0166351 | A1 | 6/2014 | Lee et al. |
| 2014/0301014 | A1 | 10/2014 | Kim |
| 2015/0049413 | A1 | 2/2015 | Wada et al. |
| 2015/0340155 | A1 | 11/2015 | Fukunaga et al. |
| 2015/0340156 | A1 | 11/2015 | Masunari et al. |
| 2017/0018363 | A1 | 1/2017 | Tanaka et al. |
| 2017/0169952 | A1* | 6/2017 | Kato ............... H01G 4/30 |
| 2017/0213649 | A1* | 7/2017 | Kato ............... H01G 4/30 |
| 2018/0108482 | A1* | 4/2018 | Kogure ............... H01G 4/01 |
| 2018/0261390 | A1* | 9/2018 | Sakate ............... H01G 4/30 |
| 2020/0051740 | A1 | 2/2020 | Park et al. |
| 2020/0051741 | A1 | 2/2020 | Park et al. |

FOREIGN PATENT DOCUMENTS

| CN | 105097282 A | 11/2015 |
| CN | 106944028 A | 7/2017 |
| CN | 110828166 A | 2/2020 |
| CN | 110828171 A | 2/2020 |
| JP | 2014-150240 A | 8/2014 |
| JP | 2016-001721 A | 1/2016 |
| JP | 2017-011172 A | 1/2017 |
| JP | 2018-148118 A | 9/2018 |
| KR | 10-2010-0136917 A | 12/2010 |
| KR | 10-2012-0080657 A | 7/2012 |
| WO | 2014/148373 A1 | 9/2014 |

OTHER PUBLICATIONS

Chinese Office Action dated Feb. 25, 2022, issued in corresponding Chinese Patent Application No. 201811524922.7 (with English translation).
Japanese Office Action dated Oct. 4, 2022, issued in corresponding Japanese Patent Application No. 2018-197941.
Chinese Office Action dated Oct. 10, 2022, issued in corresponding Chinese Patent Application No. 201811524922.7.

* cited by examiner

MULTILAYER CERAMIC CAPACITOR AND METHOD OF MANUFACTURING THE SAME

CROSS-REFERENCE TO RELATED APPLICATION(S)

This application is continuation patent application of U.S. patent application Ser. No. 16/165,363, filed on Oct. 19, 2018, which claims the benefit of priority to Korean Patent Application No. 10-2018-0092772 filed on Aug. 9, 2018 in the Korean Intellectual Property Office, the disclosures of which are incorporated herein by reference in their entireties.

TECHNICAL FIELD

The present disclosure relates to a multilayer ceramic capacitor having improved reliability by adjusting contents of magnesium (Mg) contained in a side margin portion and a cover portion, and a method of manufacturing the same.

BACKGROUND

In general, electronic components using a ceramic material, such as capacitors, inductors, piezoelectric elements, varistors, thermistors, or the like, include a ceramic body formed of a ceramic material, internal electrodes formed in the ceramic body, and external electrodes installed on a surface of the ceramic body to be connected to the internal electrodes.

Recently, as electronic products have been reduced in size and have had multifunctionality implemented therein, electronic components have also become compact and highly functional, and thus, a multilayer ceramic capacitor which is small but has a high capacitance has been demanded.

In order to allow the multilayer ceramic capacitor to have a small size and high capacitance, it is essential to significantly increase an effective area of electrodes (increase an effective volume fraction required to implement capacitance).

In order to implement the multilayer ceramic capacitor having a small size and high capacitance as described above, a method of significantly increasing an area of internal electrodes in a width direction through a margin-free design by allowing the internal electrodes to be exposed to a body in the width direction at the time of manufacturing the multilayer ceramic capacitor, and then separately attaching a side margin portion to an electrode exposed surface of a capacitor in the width direction before sintering the capacitor after manufacturing this capacitor has been applied.

However, in this method, a large number of voids may be formed in an interface between a ceramic body and the side margin portion at the time of forming the side margin portion, which may deteriorate reliability.

Further, an electric field may be concentrated due to the voids formed in the interface between the ceramic body and the side margin portion, and thus, a breakdown voltage (BDV) may decrease.

In addition, a sintering density of an external portion may be deteriorated due to the voids, such that moisture resistance reliability may be deteriorated.

Therefore, research of technologies for preventing a decrease in breakdown voltage (BDV) and deterioration of moisture resistance reliability in a product having a micro size and high capacitance is needed.

SUMMARY

An aspect of the present disclosure may provide a multilayer ceramic capacitor having improved reliability by adjusting contents of magnesium (Mg) contained in a side margin portion and a cover portion, and a method of manufacturing the same.

According to an aspect of the present disclosure, a multilayer ceramic capacitor may include: a ceramic body including dielectric layers and having first and second surfaces opposing each other, third and fourth surfaces connecting the first and second surfaces, and fifth and sixth surfaces connected to the first to fourth surfaces and opposing each other; a plurality of internal electrodes disposed in the ceramic body, exposed to the first and second surfaces, and each having one end exposed to the third or fourth surface; and a first side margin portion and a second side margin portion disposed on end portions of the internal electrodes exposed to the first and second surfaces, respectively, wherein the ceramic body includes an active portion including the plurality of internal electrodes disposed to face each other with each of the dielectric layers interposed therebetween and forming capacitance, and cover portions disposed on upper and lower surfaces of the active portion, each of the first and second side margin portions is divided into a first region adjacent to an outer surface of the first and second side margin portions and a second region adjacent to the plurality of internal electrodes exposed to the first and second surfaces, each of the cover portions is divided into a first region adjacent to an outer surface of the ceramic body and a second region adjacent to an internal electrode disposed in an outermost portion of the ceramic body among the plurality of internal electrodes, and contents of magnesium (Mg) contained in the second regions of the cover portions and the first and second side margin portions are larger than contents of magnesium (Mg) contained in the first regions of the cover portions and the first and second side margin portions, respectively.

According to another exemplary embodiment in the present disclosure, a method of manufacturing a multilayer ceramic capacitor may include: preparing a first ceramic green sheet on which a plurality of first internal electrode patterns are disposed to have a predetermined interval therebetween and a second ceramic green sheet on which a plurality of second internal electrode patterns are disposed to have a predetermined interval therebetween, forming a ceramic green sheet laminate by stacking the first and second ceramic green sheets so that the plurality of first and second internal electrode patterns are alternated with each other, cutting the ceramic green sheet laminate to have side surfaces to which distal ends of the plurality of first and second internal electrode patterns are exposed in a width direction, forming a first side margin portion and a second side margin portion on the side surfaces of the ceramic green sheet laminate to which the distal ends of the plurality of first and second internal electrode patterns are exposed, and preparing a ceramic body including dielectric layers and first and second internal electrodes by sintering the cut ceramic green sheet laminate, wherein the ceramic body includes an active portion including the first and second internal electrodes disposed to face each other with each of the dielectric layers interposed therebetween and forming capacitance, and cover portions disposed on upper and lower surfaces of the active portion, each of the first and second side margin portions is divided into a first region adjacent to an outer surface of the first and second side margin portions and a second region adjacent to the first and second internal electrodes, each of the cover portions is divided into a first region adjacent to an outer surface of the ceramic body and a second region adjacent to an internal electrode disposed in an outermost portion of the ceramic body among the first and second internal electrodes, and contents of magnesium (Mg) contained in the second regions of the cover portions and the first and second side margin portions are larger than contents of magnesium (Mg) contained in the first regions of the cover portions and the first and second side margin portions, respectively.

According to still another exemplary embodiment in the present disclosure, a multilayer ceramic capacitor may include: a ceramic body including dielectric layers and having first and second surfaces opposing each other, third and fourth surfaces connecting the first and second surfaces, and fifth and sixth surfaces connected to the first to fourth surfaces and opposing each other; a plurality of internal electrodes disposed in the ceramic body, exposed to the first and second surfaces, and each having one end exposed to the third or fourth surface; and a first side margin portion and a second side margin portion disposed on end portions of the internal electrodes exposed to the first and second surfaces, respectively, wherein the ceramic body includes an active portion including the plurality of internal electrodes disposed to face each other with each of the dielectric layers interposed therebetween and forming capacitance, each of the first and second side margin portions is divided into a first region adjacent to an outer surface of the first and second side margin portions and a second region adjacent to the plurality of internal electrodes exposed to the first and second surfaces, and contents of magnesium (Mg) contained in the second regions of the first and second side margin portions are larger than contents of magnesium (Mg) contained in the first regions of the first and second side margin portions, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
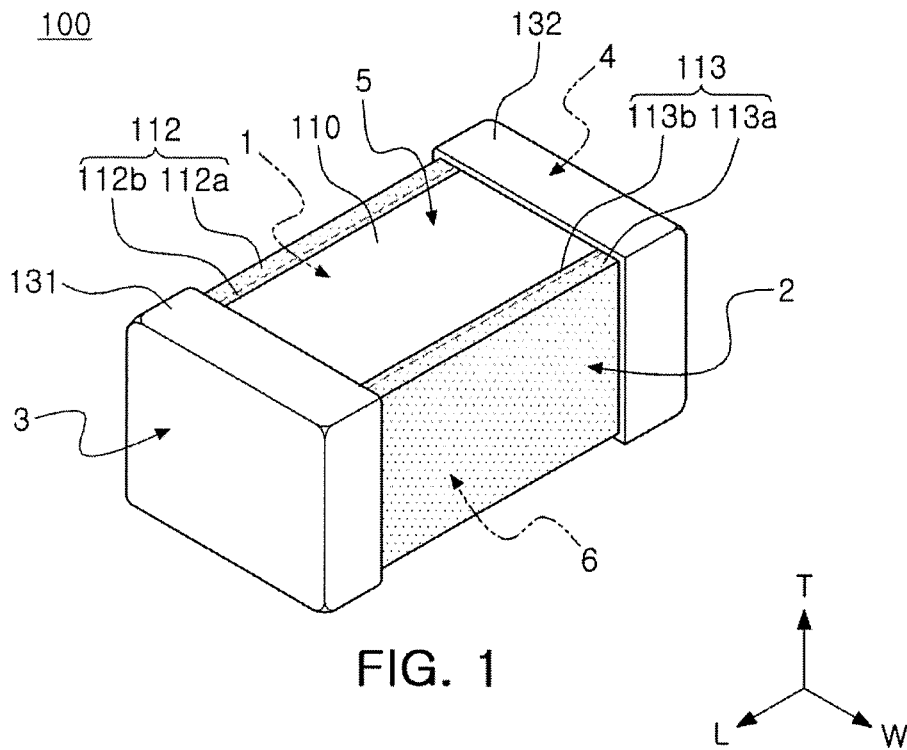
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
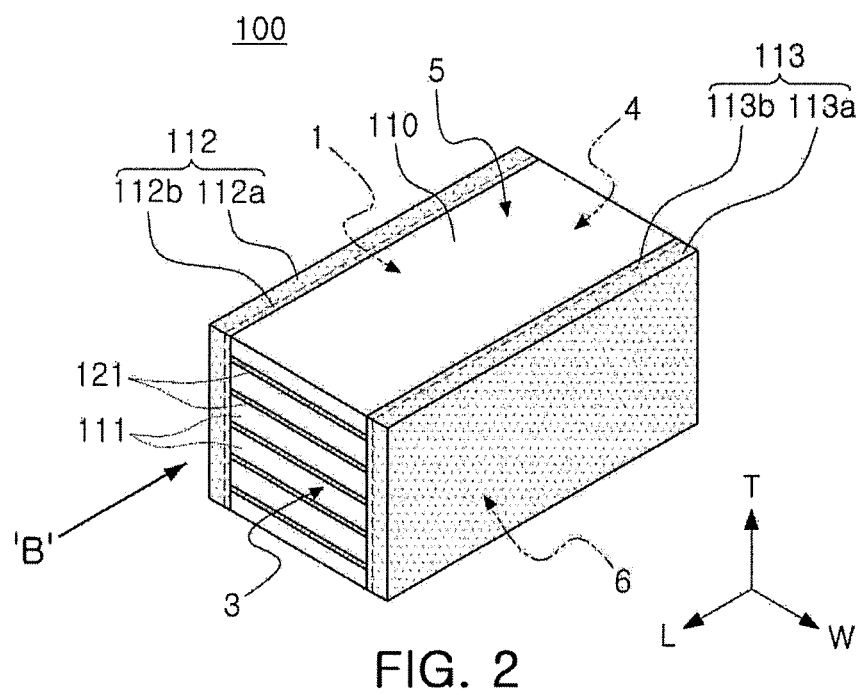
FIG. 2 is a perspective view illustrating an exterior of a ceramic body of FIG. 1.

FIG. 2 is a perspective view illustrating an exterior of a ceramic body of FIG. 1.

Figure 3:
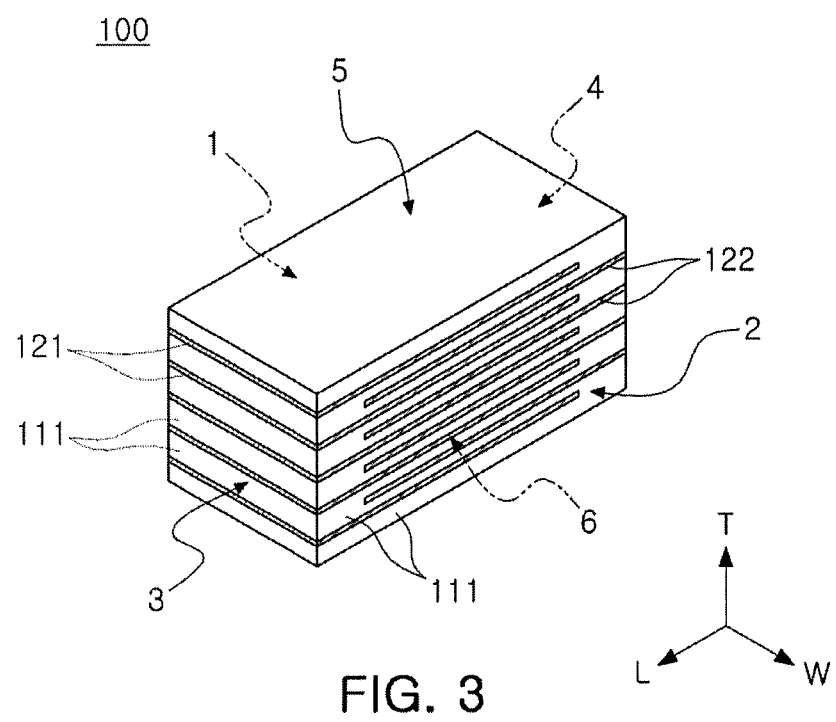
FIG. 3 is a perspective view of a ceramic green sheet laminate before sintering the ceramic body of FIG. 2.

FIG. 3 is a perspective view of a ceramic green sheet laminate before sintering the ceramic body of FIG. 2.

Figure 4:
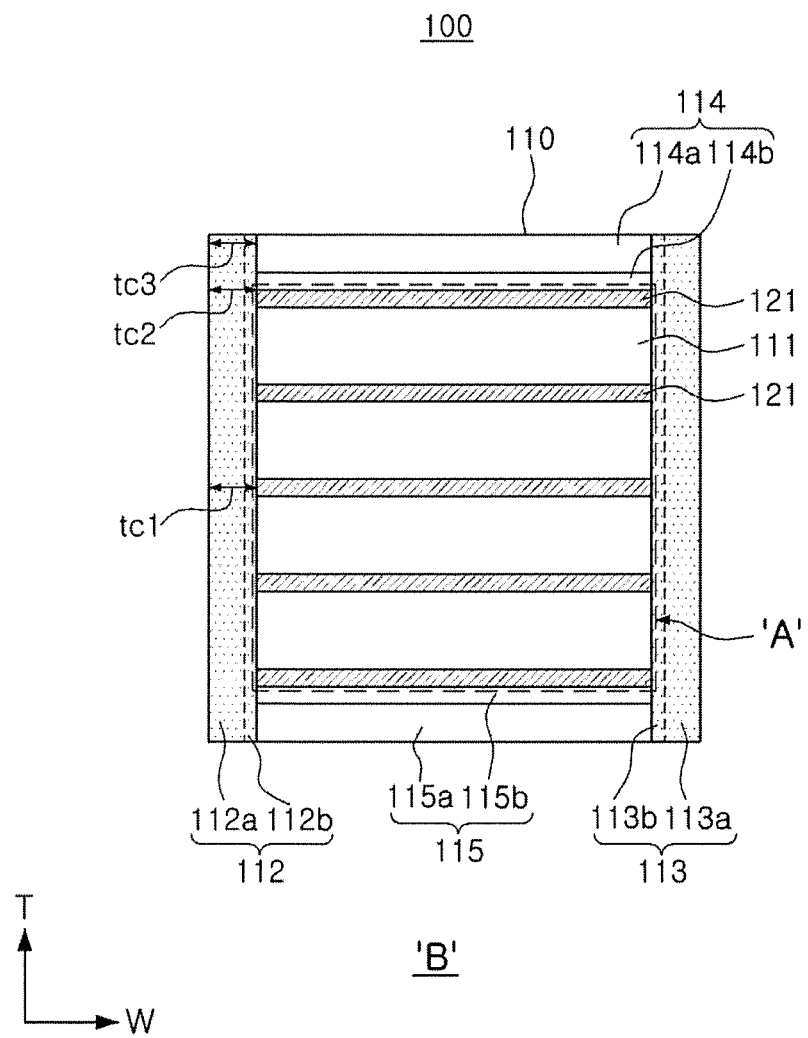
FIG. 4 is a side view illustrating of the ceramic body in a B direction of FIG. 2.

FIG. 4 is a side view illustrating of the ceramic body in a B direction of FIG. 2.

Referring to FIGS. 1 through 4, a multilayer ceramic capacitor 100 according to the present exemplary embodiment may include a ceramic body 110; a plurality of internal electrodes 121 and 122 disposed in the ceramic body 110; and external electrodes 131 and 132 disposed on an outer surface of the ceramic body 110.

The ceramic body 110 may have first and second surfaces 1 and 2 opposing each other, third and fourth surfaces 3 and 4 connecting the first and second surfaces to each other, and fifth and sixth surfaces 5 and 6 corresponding to upper and lower surfaces, respectively.

The first and second surfaces 1 and 2 may be defined as surfaces of the ceramic body 110 opposing each other in a width direction, the third and fourth surfaces 3 and 4 may be defined as surfaces of the ceramic body 110 opposing each other in a length direction, and the fifth and sixth surfaces 5 and 6 may be defined as surfaces of the ceramic body 110 opposing each other in a thickness direction.

A shape of the ceramic body 110 is not particularly limited, but may be a rectangular parallelepiped shape as illustrated.

One end of each of the plurality of internal electrodes 121 and 122 disposed in the ceramic body 110 may be exposed to the third or fourth surface 3 or 4 of the ceramic body 110.

The internal electrodes 121 and 122 may be formed as a pair of first and second internal electrodes 121 and 122 having different polarities from each other.

One end of the first internal electrode 121 may be exposed to the third surface 3 and one end of the second internal electrode 122 may be exposed to the fourth surface 4.

The other end of each of the first and second internal electrodes 121 and 122 may be spaced apart from the third or fourth surface 3 or 4 by a predetermined interval.

The first and second external electrodes 131 and 132 may be formed on the third and fourth surfaces 3 and 4 of the ceramic body 110 to be electrically connected to the internal electrodes.

The multilayer ceramic capacitor 100 according to the exemplary embodiment in the present disclosure may include the plurality of internal electrodes 121 and 122 disposed in the ceramic body 110, exposed to the first and second surfaces 1 and 2, and each having one end exposed to the third or fourth surface 3 or 4. First and second side margin portions 112 and 113 may be disposed on end portions of the first and second internal electrodes 121 and 122 exposed to the first and second surfaces 1 and 2, respectively.

The plurality of internal electrodes 121 and 122 may be formed in the ceramic body 110, a distal end of each of the plurality of internal electrodes 121 and 122 may be exposed to the first and second surfaces 1 and 2, the surfaces of the ceramic body 110 in the width direction, and the first and second side margin portions 112 and 113 may be disposed on the exposed end portions, respectively.

An average thickness d1 of the first and second side margin portions 112 and 113 may be 2 μm or more to 10 μm or less.

According to the exemplary embodiment in the present disclosure, the ceramic body 110 may include a laminate in which a plurality of dielectric layers 111 are stacked and the first and second side margin portions 112 and 113 disposed on both side surfaces of the laminate.

The plurality of dielectric layers 111 may be in a sintered state and adjacent dielectric layers may be integrated with each other so that boundaries therebetween are not readily apparent.

A length of the ceramic body 110 may correspond to a distance from the third surface 3 of the ceramic body 110 to the fourth surface 4 thereof.

A length of the dielectric layer 111 may correspond to a distance from the third surface 3 of the ceramic body 110 to the fourth surface 4 thereof.

According to the exemplary embodiment in the present disclosure, the length of the ceramic body 110 may be 400 to 1400 μm, but is not limited thereto. In more detail, the length of the ceramic body 110 may be 400 to 800 μm or 600 to 1400 μm.

The internal electrodes 121 and 122 may be formed on the dielectric layers 111 and be disposed in the ceramic body 110 with each of the dielectric layers 111 interposed therebetween by sintering.

Referring to FIG. 3, the first internal electrode 121 may be formed on the dielectric layer 111. The first internal electrode 121 may not be entirely formed in a length direction of the dielectric layer 111. That is, one end of the first internal electrode 121 may be formed to have a predetermined interval from the fourth surface 4 of the ceramic body 110, and the other end of the first internal electrode 121 may be formed up to the third surface 3 of the ceramic body 110 to be exposed to the third surface 3 of the ceramic body 110.

The other end of the first internal electrode exposed to the third surface 3 of the ceramic body 110 may be connected to the first external electrode 131.

Differently from the first internal electrode, one end of the second internal electrode 122 may be formed to have a predetermined interval from the third surface 3, and the other end of the second internal electrode 122 may be exposed to the fourth surface 4 to thereby be connected to the second external electrode 132.

In order to implement a high-capacitance multilayer ceramic capacitor, the number of stacked internal electrode layers may be 400 or more, but is not necessarily limited thereto.

The dielectric layer 111 may have the same width as that of the first internal electrode 121. That is, the first internal electrode 121 may be entirely formed on the dielectric layer 111 in a width direction of the dielectric layer 111.

According to the exemplary embodiment in the present disclosure, the width of the dielectric layer 111 and the width of the internal electrode may be 100 to 900 μm, but are not limited thereto. In more detail, the width of the dielectric layer 111 and the width of the internal electrode may be 100 to 500 μm or 100 to 900 μm.

As the ceramic body becomes miniaturized, a thickness of the side margin portion may have an influence on electrical characteristics of the multilayer ceramic capacitor. According to the exemplary embodiment in the present disclosure, the side margin portion may be formed to have a thickness of 10 μm or less, thereby improving characteristics of a miniaturized multilayer ceramic capacitor.

That is, as the side margin portion may be formed to have a thickness of 10 μm or less, an area of an overlapping region between the internal electrodes forming capacitance may be secured as much as possible, such that a multilayer ceramic capacitor having high capacitance and a small size may be implemented.

The ceramic body 110 as described above may include an active portion A as a portion contributing to forming capacitance of the capacitor and upper and lower cover portions 114 and 115 formed on upper and lower surfaces of the active portion A, respectively, as upper and lower margin portions.

The active portion A may be formed by repeatedly stacking the plurality of first and second internal electrodes 121 and 122 with each of the dielectric layers 111 interposed therebetween.

The upper and lower cover portions 114 and 115 may have the same material and configuration as those of the dielectric layer 111 except that internal electrodes are not included therein.

That is, the upper and lower cover portions 114 and 115 may contain a ceramic material, for example, a barium titanate ($BaTiO_3$) based ceramic material.

Each of the upper and lower cover portions 114 and 115 may have a thickness of 20 μm, but is not necessarily limited thereto.

The upper and lower cover portions 114 and 115 may be formed by stacking one or at least two dielectric layers on upper and lower surfaces, respectively, of the active portion A in the thickness direction, and generally serve to prevent the internal electrode from being damaged by physical or chemical stress.

In the exemplary embodiment in the present disclosure, the internal electrode and the dielectric layer may be formed by being simultaneously cut, such that the width of the internal electrode may be equal to that of the dielectric layer. A more detailed description thereof will be described below.

In the present exemplary embodiment, the dielectric layer may be formed to have the same width as that of the internal electrode, such that the distal ends of the internal electrodes 121 and 122 may be exposed to the first and second surfaces 1 and 2 of the ceramic body 110 in the width direction.

The first and second side margin portions 112 and 113 may be formed on both side surfaces of the ceramic body 110 in the width direction, to which the distal ends of the internal electrodes 121 and 122 are exposed.

The thickness of the first and second side margin portions 112 and 113 may be 10 μm or less. The thinner the thickness of the first and second side margin portions 112 and 113, the wider the area of the overlapping region between the internal electrodes formed in the ceramic body 110.

The thickness of the first and second side margin portions 112 and 113 is not limited as long as short-circuit of the internal electrodes exposed to the side surface of the ceramic body 110 may be prevented. For example, the thickness of the first and second side margin portions 112 and 113 may be 2 μm or more.

When the thickness of the first and second side margin portions is less than 2 μm, mechanical strength against external impact may be deteriorated, and when the thickness of the first and second side margin portions is more than 10 μm, the area of the overlapping region between the internal electrodes may relatively decrease, such that it may be difficult to secure high capacitance of the multilayer ceramic capacitor.

In order to significantly increase capacitance of a multilayer ceramic capacitor, a method of thinning the dielectric layer, a method of highly stacking thinned dielectric layers, a method of increasing a coverage of the internal electrode, and the like, have been considered.

Further, a method of increasing an area of an overlapping region between internal electrodes forming capacitance has been considered.

In order to increase the area of the overlapping region between the internal electrodes, there is a need to significantly decrease a region of a margin portion in which the internal electrode is not formed.

In particular, as the multilayer ceramic capacitor becomes miniaturized, the region of the margin portion needs to be significantly decreased in order to increase the overlapping region between the internal electrodes.

According to the present exemplary embodiment, the internal electrode may be formed on the entire dielectric layer in the width direction and the thickness of the side margin portion may be set to be 10 µm or less, such that the area of the overlapping region between the internal electrodes may become wide.

Generally, as the dielectric layer is highly stacked, thicknesses of the dielectric layer and the internal electrode may decrease. Therefore, the phenomenon that the internal electrodes are short-circuited may frequently occur. In addition, when the internal electrode is formed only on a portion of the dielectric layer, an accelerated lifespan of insulating resistance or reliability may be deteriorated due to a step by the internal electrode.

However, according to the present exemplary embodiment, even though thin internal electrodes and thin dielectric layers are formed, since the internal electrode is entirely formed on the dielectric layer in the width direction, the area of the overlapping region between the internal electrodes may be increased, thereby increasing the capacitance of the multilayer ceramic capacitor.

In addition, an accelerated lifespan of insulating resistance may be improved by decreasing the step by the internal electrode, such that a multilayer ceramic capacitor having excellent capacitance characteristics and reliability may be provided.

According to the exemplary embodiment in the present disclosure, the first and second side margin portions 112 and 113 may be divided into first regions 112a and 113a adjacent to outer surfaces of the side margin portions 112 and 113 and second regions 112b and 113b adjacent to the first and second internal electrodes 121 and 122 exposed to the first and second surfaces 1 and 2 of the ceramic body 110, respectively. The content of magnesium (Mg) contained in the second regions 112b and 113b may be larger than the content of magnesium (Mg) contained in the first regions 112a and 113a.

A breakdown voltage (BDV) may be increased and reliability may be improved by dividing the first and second side margin portions 112 and 113 disposed on the side surfaces of the ceramic body 110 into two regions having different compositions, respectively and adjusting the content of magnesium (Mg) contained in the second regions 112b and 113b to be larger than that in the first regions 112a and 113a.

In detail, a length of oxide layers of the distal ends of the internal electrodes exposed to the side surfaces of the ceramic body 110 in the width direction may be controlled by adjusting the content of magnesium (Mg) contained in the second regions 112b and 113b of the side margin portions adjacent to the internal electrodes 121 and 122 exposed to the first and second surfaces 1 and 2 of the ceramic body 110, and thus, the breakdown voltage (BDV) may be increased and moisture resistance reliability may be improved.

However, a large number of voids may be formed in an interface between a ceramic body 110 and a side margin portion 112 and 113 at the time of forming the side margin portion, which may deteriorate reliability.

Further, an electric field may be concentrated due to the voids formed in the interface between the ceramic body 110 and the side margin portion 112 and 113, and thus, a breakdown voltage (BDV) may decrease.

In addition, a sintering density of an external portion may be deteriorated due to the voids, such that moisture resistance reliability may be deteriorated.

According to the exemplary embodiment in the present disclosure, an oxide layer may be formed in a void formed in an interface between the ceramic body 110 and the side margin portion 112 and 113 by adjusting the content of magnesium (Mg) contained in the second regions 112b and 113b at inner sides of the side margin portions 112 and 113 adjacent to the internal electrodes 121 and 122 exposed to the first and second surfaces 1 and 2 of the ceramic body 110.

As described above, in a case of forming the oxide layer in the void formed in the interface between the ceramic body 110 and the side margin portion 112 and 113, concentration of the electric field may be alleviated by securing insulation properties, such that the breakdown voltage (BDV) may increase and a short-circuit defect rate may decrease.

Further, a density of the first and second side margin portions 112 and 113 may be improved by dividing the first and second side margin portions 112 and 113 disposed on the side surfaces of the ceramic body 110 into two regions having different compositions, respectively and allowing the contents of magnesium (Mg) contained in the respective regions to be different from each other, such that moisture resistance may be improved.

In detail, a density of the first regions 112a and 113a of the first and second side margin portions 112 and 113 may be improved by adjusting the content of magnesium (Mg) contained in the second regions 112b and 113b of the side margin portions 112 and 113 to be larger than that in the first regions 112a and 113a, such that moisture resistance may be improved.

Particularly, adhesive force with the first and second external electrodes 131 and 132 may be improved by allowing the first regions 112a and 113a of the first and second margin portions 112 and 113 adjacent to the outer surfaces of the side margin portions 112 and 113 to contain a small content of magnesium (Mg).

The content of magnesium (Mg) contained in the second regions 112b and 113b of the first and second side margin portions 112 and 113 may be adjusted to be larger than that in the first regions 112a and 113a by allowing a dielectric composition for forming the ceramic body 110 and a dielectric composition for forming the first and second side margin portions 112 and 113 to be different from each other in a process of manufacturing the multilayer ceramic capacitor 100.

That is, in a case of increasing the content of magnesium (Mg) in the dielectric composition for forming the first and second side margin portions unlike the dielectric composition for forming the ceramic body 110 and adjusting the content of magnesium (Mg) by diffusion in the sintering, the content of magnesium (Mg) contained in the second regions 112b and 113b may be adjusted to be larger than that in the first regions 112a and 113a.

Therefore, the electric field concentrated on distal end portions of the internal electrodes 121 and 122 may be alleviated, and reliability of the multilayer ceramic capacitor 100 may be improved by preventing insulation breakdown, which is one of main defects of a multilayer ceramic capacitor.

According to the exemplary embodiment of the present disclosure, the content of magnesium (Mg) in the second regions 112b and 113b of the first and second side margin portions 112 and 113 may be 10 moles or more to 30 moles or less based on titanium (Ti) contained in the first and second side margin portions.

By adjusting the content of magnesium (Mg) in the second regions 112b and 113b of the first and second side margin portions 112 and 113 to be 10 moles or more to 30 moles or less based on titanium (Ti) contained in the first and second side margin portions, the breakdown voltage (BDV) may be increased, and moisture resistance reliability may be improved.

When the content of magnesium (Mg) in the second regions 112b and 113b of the first and second side margin portions 112 and 113 is less than 10 moles based on titanium (Ti) contained in the first and second side margin portions, the oxide layer is not sufficiently formed in the voids formed in the interface between the ceramic body 110 and the side margin portion 112 and 113, such that the breakdown voltage (BDV) may decrease, and a short-circuit defect may be increased.

Meanwhile, when the content of magnesium (Mg) in the second regions 112b and 113b of the first and second side margin portions 112 and 113 is more than 30 moles based on titanium (Ti) contained in the first and second side margin portions, reliability and distribution of the breakdown voltage (BDV) may become non-uniform due to deterioration of a sintering property.

Referring to FIG. 4, the upper and lower cover portions 114 and 115 may be divided into first regions 114a and 115a adjacent to the outer surface of the ceramic body 110 and second regions 114b and 115b adjacent to internal electrodes disposed in outermost portions of the ceramic body 110 among the plurality of internal electrodes 121 and 122, respectively, and the content of magnesium (Mg) contained in the second regions 114b and 115b may be larger than the content of magnesium (Mg) contained in the first regions 114a and 115a.

By dividing the upper and lower cover portions 114 and 115 of the ceramic body 110 into two regions having different compositions from each other and adjusting contents of magnesium contained in respective regions to be different from each other, a density of the upper and lower cover portions 114 and 115 may be improved, such that moisture resistance may be improved.

The content of magnesium (Mg) contained in the second regions 114b and 115b of the upper and lower cover portions 114 and 115 may be larger than the content of magnesium (Mg) contained in the first regions 114a and 115a.

The density of the upper and lower cover portions 114 and 115 may be improved by adjusting the content of magnesium (Mg) contained in the second regions 114b and 115b of the upper and lower cover portions 114 and 115 to be larger than the content of magnesium (Mg) contained in the first regions 114a and 115a, such that moisture resistance may be improved.

Particularly, adhesive force with the first and second external electrodes 131 and 132 may be improved by allowing the content of magnesium (Mg) contained in the first regions 114a and 115a of the upper and lower cover portions 114 and 115 adjacent to the outer surface of the ceramic body 110 to be relatively small.

Further, the content of magnesium (Mg) contained in the second regions 114b and 115b of the upper and lower cover portions 114 and 115 may be 10 moles or more to 30 moles or less based on titanium (Ti) contained in the upper and lower cover portions 114 and 115.

Moisture resistance reliability may be improved by adjusting the content of magnesium (Mg) contained in the second regions 114b and 115b of the upper and lower cover portions 114 and 115 to be 10 moles or more to 30 moles or less based on titanium (Ti) contained in the upper and lower cover portions 114 and 115.

When the content of magnesium (Mg) contained in the second regions 114b and 115b of the upper and lower cover portions 114 and 115 is less than 10 moles based on titanium (Ti) contained in the upper and lower cover portions 114 and 115, grain growth of dielectric grains in the second regions 114b and 115b of the upper and lower cover portions 114 and 115 may be excessive, such that DC-bias characteristics may not be secured and it may be difficult to secure capacitance to be required.

Meanwhile, when the content of magnesium (Mg) contained in the second regions 114b and 115b of the upper and lower cover portions 114 and 115 is more than 30 moles based on titanium (Ti) contained in the upper and lower cover portions 114 and 115, distribution of moisture resistance reliability may be non-uniform due to deterioration of a sintering property.

The second regions 114b and 115b of the upper and lower cover portions 114 and 115 may further contain an additive for reinforcing adhesive force with the ceramic body 110.

The content of magnesium (Mg) contained in the second regions 114b and 115b of the upper and lower cover portions 114 and 115 may be adjusted to be larger than the content of magnesium (Mg) contained in the first regions 114a and 115a by allowing a dielectric composition for forming the ceramic body 110 and a dielectric composition for the cover portions to be different from each other in a manufacturing process of the multilayer ceramic capacitor.

That is, in the case of increasing the content of magnesium (Mg) in the dielectric composition for forming the cover portions unlike the dielectric composition of the ceramic body and adjusting the content of magnesium (Mg) by diffusion in the sintering, the content of magnesium (Mg) contained in the second regions 114b and 115b of the upper and lower cover portions 114 and 115 may be adjusted to be larger than the content of magnesium (Mg) contained in the first regions 114a and 115a.

The multilayer ceramic capacitor according to the exemplary embodiment in the present disclosure may be a micro-sized multilayer ceramic capacitor in which a thickness of the dielectric layer 111 may be 0.4 μm or less, and a thickness of the first and second internal electrodes 121 and 122 is 0.4 μm or less.

In a case of using thin layers in which the thickness of the dielectric layer 111 is 0.4 μm or less and the thickness of the first and second internal electrodes 121 and 122 is 0.4 μm or less as in the exemplary embodiment in the present disclosure, a reliability problem caused by voids generated in an interface between a ceramic body and a side margin portion is significantly important.

That is, in a multilayer ceramic capacitor according to the related art, even though the content of magnesium (Mg) in each region of the side margin portions included in the multilayer ceramic capacitor according to the exemplary embodiment in the present disclosure is not adjusted, there is no large problem in reliability.

However, in a product in which thin layers of dielectric layers and internal electrodes are used as in the exemplary embodiment in the present disclosure, in order to prevent BDV from being reduced and prevent reliability from being deteriorated by the voids formed in the interface between the ceramic body and the side margin portion, the content of magnesium (Mg) in each region of the side margin portions needs to be adjusted.

That is, in the exemplary embodiment in the present disclosure, by adjusting the content of magnesium (Mg) in the second regions 112b and 113b to be 10 moles or more to 30 moles or less based on titanium (Ti) contained in the first and second side margin portions, the breakdown voltage (BDV) may be increased, and moisture resistance reliability may be improved, even in a case of thin layers in which the dielectric layers 111 and the first and second internal electrodes 121 and 122 have a thickness of 4 μm or less.

However, the term "thin layer" does not mean that the thicknesses of the dielectric layer 11 and the first and second internal electrodes 121 and 122 are 0.4 μm or less, but may be understood as a concept including dielectric layers and internal electrodes having a thin thickness as compared to a product according to the related art.

Meanwhile, a width of the first regions 112a and 113a of the first and second side margin portions 112 and 113 may be 12 μm or less and a width of the second regions 112b and 113b may be 3 μm or less, but are not necessarily limited thereto.

Referring to FIG. 4, a ratio of a thickness tc2 of a region of the first or second side margin portion 112 and 113 coming into contact with a distal end of an internal electrode disposed in an outermost portion of the ceramic body 110 in the thickness direction to a thickness tc1 of a region of the first or second side margin portion 112 and 113 coming into contact with a distal end of an internal electrode disposed in a central portion of the ceramic body 110 in the thickness direction among the plurality of internal electrodes 121 and 122 may be 1.0 or less.

A lower limit value of the ratio of the thickness tc2 of the region of the first or second side margin portion 112 and 113 coming into contact with the distal end of the internal electrode disposed in the outermost portion of the ceramic body 110 to the thickness tc1 of the region of the first or second side margin portion 112 and 113 coming into contact with the distal end of the internal electrode disposed in the central portion of the ceramic body 110 is not particularly limited, but may be preferably 0.9 or more.

According to the exemplary embodiment in the present disclosure, since the first 112 or second margin portion 113 is formed by attaching a ceramic green sheet to the side surface of the ceramic body 110 unlike the relate art, the thickness of the first 112 or second side margin portion 113 depending on a position is uniform.

That is, according to the related art, since a side margin portion is formed by applying or printing ceramic slurry, a deviation in thickness of the side margin portion depending on a position is large.

In detail, according to the related art, a thickness of a region of first or second side margin portion coming into contact with a distal end of an internal electrode disposed in a central portion of a ceramic body is formed to be thicker than that of other regions.

For example, according to the related art, a ratio of a thickness of a region of the first or second side margin portion coming into contact with a distal end of an internal electrode disposed in an outermost portion of the ceramic body to the thickness of the region of the first or second side margin portion coming into contact with the distal end of the internal electrode disposed in the central portion of the ceramic body 110 is less than 0.9, such that the deviation in thickness is large.

In a case in which the deviation in thickness of the side margin portion depending on the position is large as described above, since in a multilayer ceramic capacitor having the same size, a portion occupied by the side margin portion is large, a large size of a capacitance forming portion may not be secured, such that there may be a difficulty in securing high capacitance.

On the contrary, in the exemplary embodiment in the present disclosure, since an average thickness of the first and second side margin portions 112 and 113 is 2 μm or more to 10 μm or less and the ratio of the thickness tc2 of the region of the first or second side margin portion 112 and 113 coming into contact with the distal end of the internal electrode disposed in the outermost portion of the ceramic body 110 to the thickness tc1 of the region of the first or second side margin portion 112 and 113 coming into contact with the distal end of the internal electrode disposed in the central portion of the ceramic body 110 is 0.9 or more to 1.0 or less, the thickness of the side margin portions may be thin and the deviation in thickness may be small, such that a large size of the capacitance forming portion may be secured.

Therefore, a high-capacitance multilayer ceramic capacitor may be implemented.

Meanwhile, referring to FIG. 4, a ratio of a thickness tc3 of a region of the first or second side margin portion 112 and 113 coming into contact with a corner of the ceramic body 110 to a thickness tc1 of the region of the first or second side margin portion 112 and 113 coming into contact with the distal end of the internal electrode disposed in the central portion of the ceramic body 110 among the plurality of internal electrodes 121 and 122 may be 1.0 or less.

A lower limit value of the ratio of the thickness tc3 of the region of the first or second side margin portion 112 and 113 coming into contact with the corner of the ceramic body 110 to the thickness tc1 of the region of the first or second side margin portion 112 and 113 coming into contact with the distal end of the internal electrode disposed in the central portion of the ceramic body 110 may be preferably 0.9 or more.

Due to the above-mentioned features, the deviation in thickness of the side margin portion depending on the region may be small, such that a large size of the capacitance forming portion may be secured, thereby making it possible to implement a high capacitance multilayer ceramic capacitor.

FIGS. 5A through 5F are cross-sectional views and a perspective view schematically illustrating a method of manufacturing a multilayer ceramic capacitor according to another exemplary embodiment in the present disclosure.

According to another exemplary embodiment in the present disclosure, there is provided a method of manufacturing a multilayer ceramic capacitor including: preparing a first ceramic green sheet on which a plurality of first internal electrode patterns are formed to have a predetermined interval therebetween and a second ceramic green sheet on which a plurality of second internal electrode patterns are formed to have a predetermined interval therebetween, forming a ceramic green sheet laminate by stacking the first and second green sheets so that the first and second internal electrode patterns are alternated with each other, cutting the ceramic green sheet laminate to have side surfaces to which distal ends of the first and second internal electrode patterns are exposed in a width direction, forming first and second side margin portions on the side surfaces of the ceramic green sheet laminate to which the distal ends of the first and second internal electrode patterns are exposed, and preparing a ceramic body including dielectric layers and first and second internal electrodes by sintering the cut laminate, wherein the ceramic body includes an active portion including the first and second internal electrodes disposed to face each other with each of the dielectric layers interposed therebetween and forming capacitance, and cover portions formed on upper and lower surfaces of the active portions, each of the first and second side margin portions is divided into a first region adjacent to an outer surface of the side margin portion and a second region adjacent to the first and second internal electrodes, each of the cover portions is divided into a first region adjacent to an outer surface of the ceramic body and a second region adjacent to an internal electrode disposed in an outermost portion of the ceramic body among the first and second internal electrodes, and contents of magnesium (Mg) contained in the second regions of the cover portions and the first and second side margin portions are larger than those of magnesium (Mg) contained in the first regions thereof, respectively.

Hereinafter, a method of manufacturing a multilayer ceramic capacitor according to another exemplary embodiment in the present disclosure will be described.

Figure 5A:
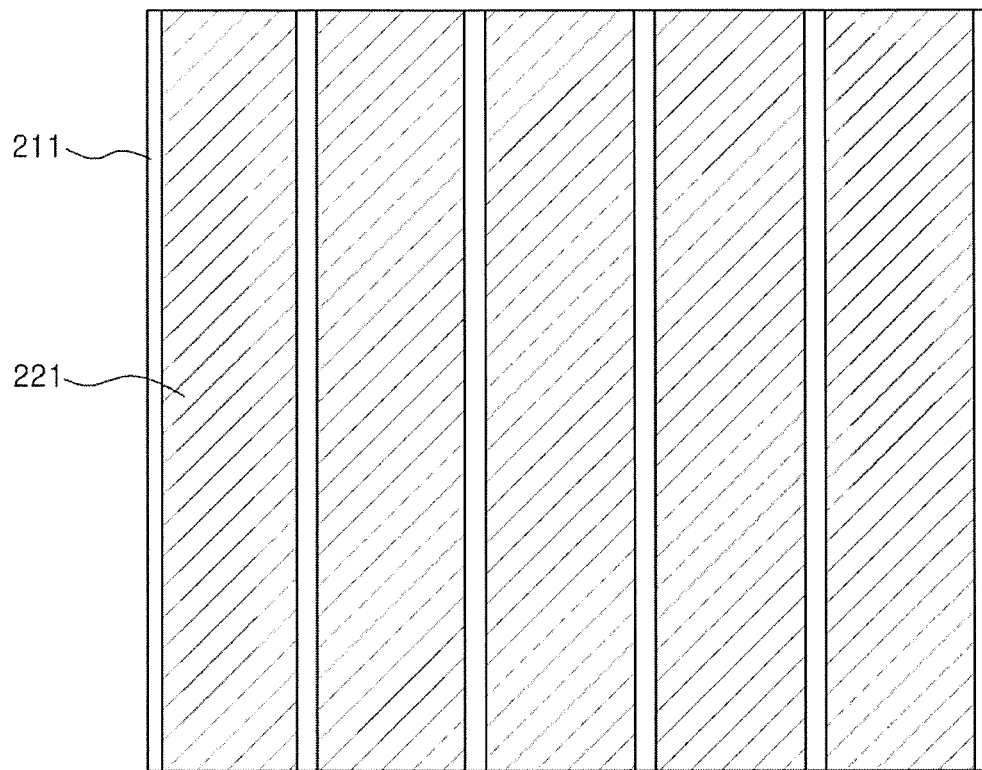
FIGS. 5A through 5F are cross-sectional views and a perspective view schematically illustrating a method of manufacturing a multilayer ceramic capacitor according to another exemplary embodiment in the present disclosure.

As illustrated in FIG. 5A, a plurality of stripe-type first internal electrode patterns 221 may be formed to have a predetermined interval therebetween on a ceramic green sheet 211. The plurality of stripe-type first internal electrode patterns 221 may be formed in parallel with each other.

The ceramic green sheet 211 may be formed of a ceramic paste containing a ceramic powder, an organic solvent, and an organic binder.

The ceramic powder may be a material having high permittivity, and a barium titanate ($BaTiO_3$)-based material, a lead complex perovskite-based material, strontium titanate ($SrTiO_3$)-based material, or the like, may be used, but the ceramic powder is not limited thereto. Among them, barium titanate ($BaTiO_3$) powder may be preferable. When the ceramic green sheet 211 is sintered, the sintered ceramic green sheet 211 may become a dielectric layer 111 configuring a ceramic body 110.

The stripe-type first internal electrode pattern 221 may be formed of an internal electrode paste containing a conductive metal. The conductive metal may be nickel (Ni), copper (Cu), palladium (Pd), or an alloy thereof, but is not limited thereto.

A method of forming the stripe-type first internal electrode pattern 221 on the ceramic green sheet 211 is not particularly limited. For example, a printing method such as a screen printing method or a gravure printing method may be used.

Further, although not illustrated, a plurality of stripe-type second internal electrode patterns 222 may be formed to have a predetermined interval therebetween on another ceramic green sheet 211.

Hereinafter, the ceramic green sheet on which the first internal electrode pattern 221 is formed may be referred to as a first ceramic green sheet, and the ceramic green sheet on which the second internal electrode pattern 222 is formed may be referred to as a second ceramic green sheet.

Figure 5B:
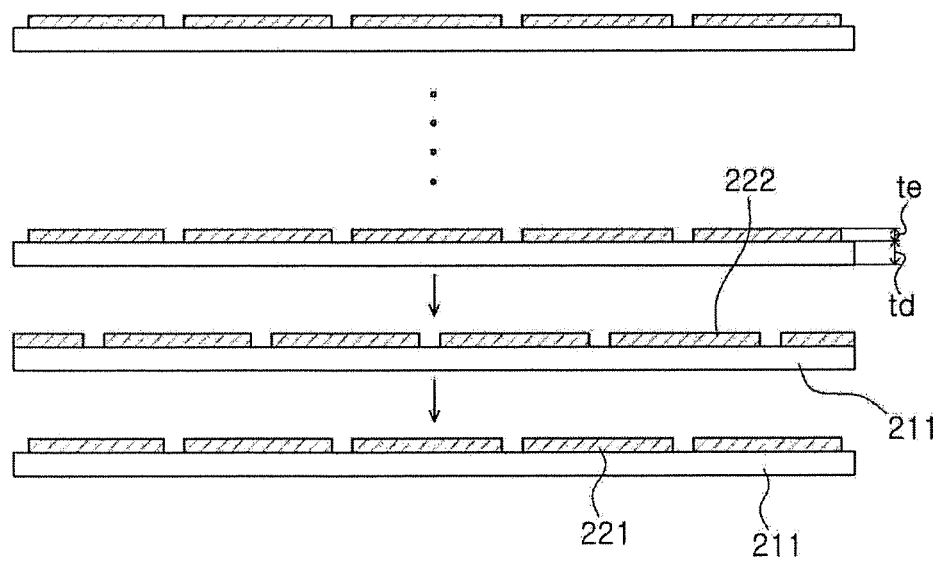

Next, as illustrated in FIG. 5B, the first and second ceramic green sheets may be alternately stacked so that the stripe-type first internal electrode pattern 221 and the stripe-type second internal electrode pattern 222 are alternately stacked.

Thereafter, the stripe-type first internal electrode pattern 221 may form a first internal electrode 121 and the stripe-type second internal electrode pattern 222 may form a second internal electrode 122.

According to another exemplary embodiment in the present disclosure, a thickness td of the first and second ceramic green sheets may be 0.6 µm or less, and a thickness te of the first and second internal electrode patterns may be 0.5 µm or less.

Since the multilayer ceramic capacitor according to the present disclosure may be a micro-sized high capacitance multilayer ceramic capacitor having thin layers in which a thickness of a dielectric layer is 0.4 µm or less, and a thickness of internal electrodes is 0.4 µm or less, the thickness td of the first and second ceramic green sheets may be 0.6 µm or less, and the thickness te of the first and second internal electrode patterns may be 0.5 µm or less.

Figure 5C:
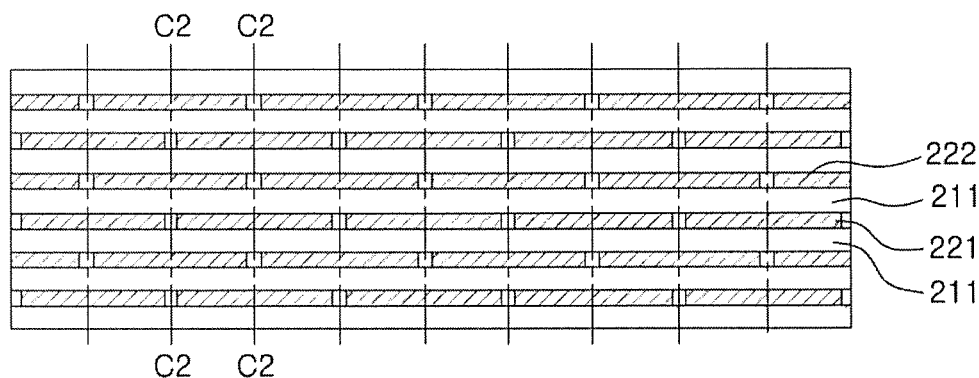
Figure 5D:
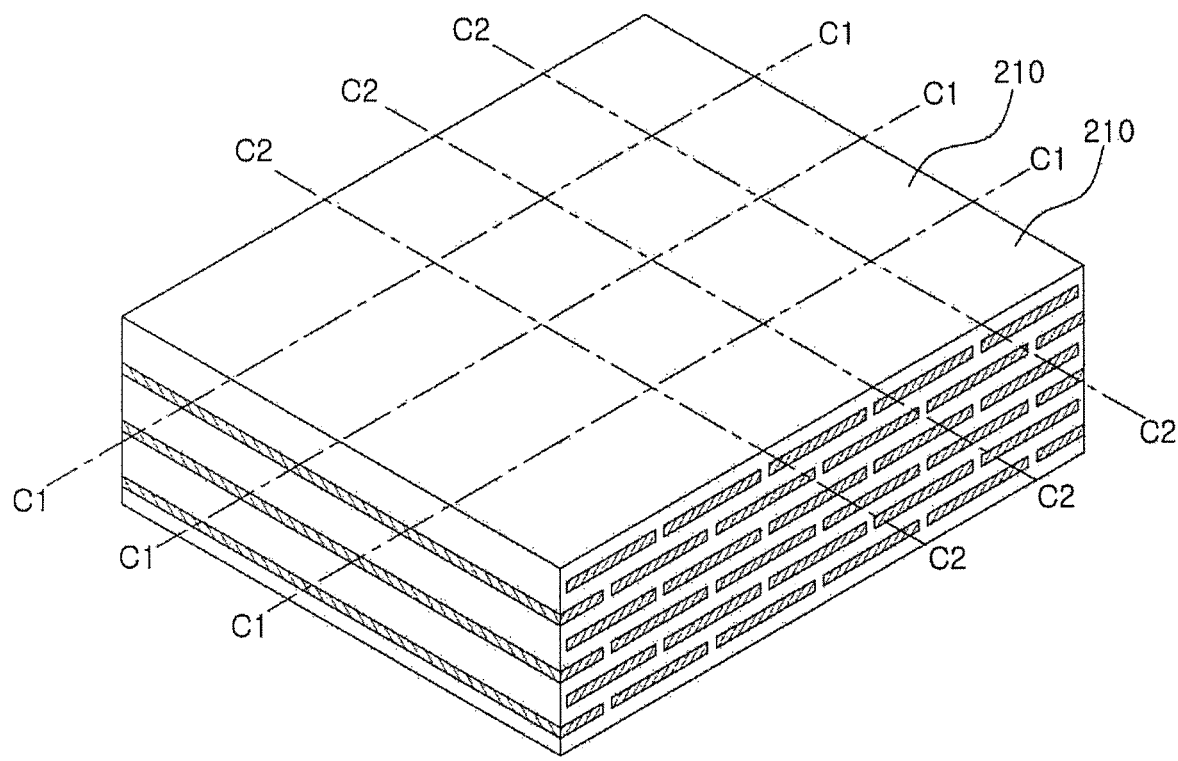

FIG. 5C is a cross-sectional view illustrating a ceramic green sheet laminate 220 in which the first and second ceramic green sheets are stacked according to the exemplary embodiment in the present disclosure, and FIG. 5D is a perspective view illustrating the ceramic green sheet laminate 220 in which the first and second ceramic green sheets are stacked.

Referring to FIGS. 5C and 5D, the first ceramic green sheet on which the plurality of stripe-type first internal electrode patterns 221 are printed in parallel and the second ceramic green sheet on which the plurality of stripe-type second internal electrode patterns 222 are printed in parallel may be alternately stacked.

In more detail, the first and second ceramic green sheets may be stacked so that central portions of the stripe-type first internal electrode patterns 221 printed on the first ceramic green sheet and the intervals between the stripe-type second internal electrode patterns 222 printed on the second ceramic green sheet overlap each other.

Next, as illustrated in FIG. 5D, the ceramic green sheet laminate 220 may be cut so as to traverse the plurality of stripe-type first internal electrode patterns 221 and the plurality of stripe-type second internal electrode patterns 222. That is, the ceramic green sheet laminate 220 may be cut into laminates 210 along cutting lines C1-C1 and C2-C2 orthogonal to each other.

In more detail, the stripe-type first internal electrode pattern 221 and the stripe-type second internal electrode pattern 222 may be cut in a length direction to be divided into a plurality of internal electrodes having a predetermined width. In this case, the stacked ceramic green sheets may be also cut together with the internal electrode patterns. As a result, the dielectric layer may be formed to have the same width as that of the internal electrode.

Further, the ceramic green sheet laminate may be cut along the cutting line C2-C2 so as to meet a size of an individual ceramic body. That is, a plurality of laminates 210 may be formed by cutting a bar-type laminate along the cutting line C2-C2 so as to be meet the size of individual ceramic body before forming first and second side margin portions.

That is, the bar-type laminate may be cut so that a central portion of overlapped first internal electrode and a predetermined interval formed between the second internal electrodes are cut along the same cutting line. Therefore, one end of each of the first and second internal electrodes 221 and 222 may be alternately exposed to a cutting surface.

Thereafter, first and second side margin portions may be formed on first and second side surfaces of the laminate 210, respectively.

Figure 5E:
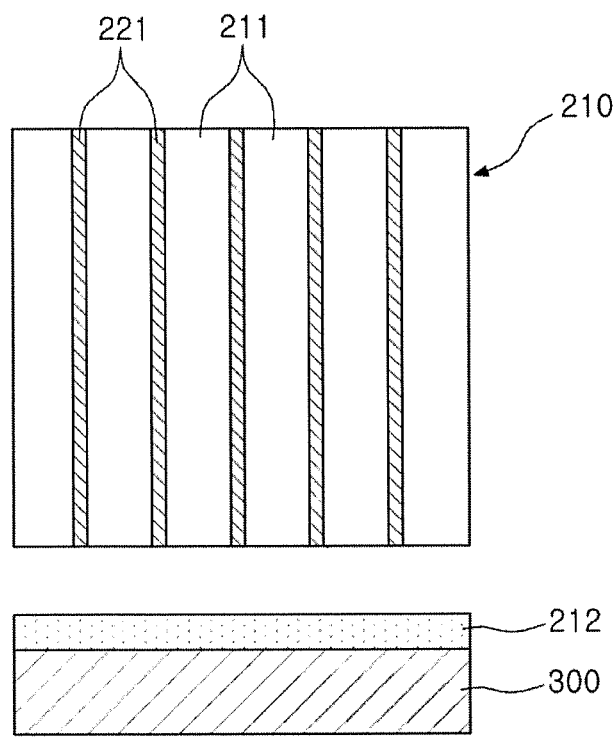

Next, as illustrated in FIG. 5E, a first side margin portion 212 and a second side margin portion (not illustrated) may be formed on the first and second side surfaces of the laminate 210, respectively.

More specifically, as a method of forming the first side margin portion 212, a side surface ceramic green sheet 212 may be disposed on an upper portion of a punching elastic material 300 formed of rubber.

Next, after rotating the laminate 210 at an angle of 90 degrees so that the first side surface of the laminate body 210 faces the side surface ceramic green sheet 212, the laminate 210 may be pressurized and closely attached to the side surface ceramic green sheet 212.

In a case of transferring the side surface ceramic green sheet 212 to the laminate 210 by pressurizing and closely attaching the laminate 210 to the side surface ceramic green sheet 212, the side surface ceramic green sheet 212 may be formed up to a corner portion of the side surface of the laminate 210 due to the punching elastic material 300 formed of rubber, and the other portions of the side surface ceramic green sheet 212 may be cut.

Figure 5F:
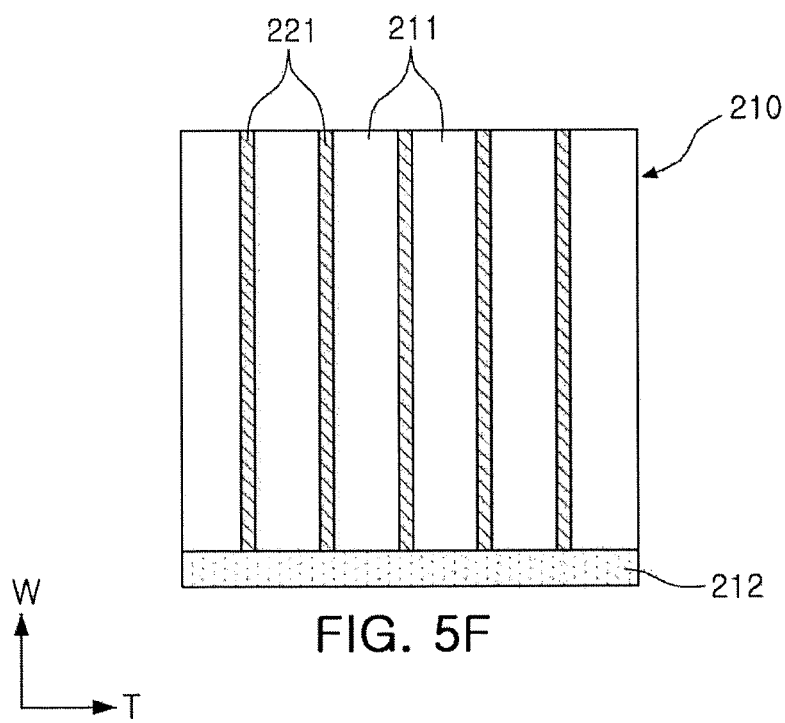

FIG. 5F illustrates the side ceramic green sheet 212 formed up to the corner portion of the side surface of the laminate 210.

Thereafter, the second side margin portion may be formed on the second surface of the laminate 210 by rotating the laminate 210.

Next, a ceramic body including dielectric layers and first and second internal electrodes may be formed by calcining and sintering the laminate 210 having both side surfaces on which the first and second side margin portions are formed.

Thereafter, external electrodes may be formed on a third side surface of the ceramic body to which the first internal electrode is exposed and a fourth side surface of the ceramic body to which the second internal electrode is exposed, respectively.

According to another exemplary embodiment in the present disclosure, since the side surface ceramic green sheet is thin and a deviation in thickness is small, a large size of a capacitance forming portion may be secured.

More specifically, since an average thickness of the first and second side margin portions 112 and 113 after the sintering is 2 μm or more to 10 μm or less and the deviation in thickness depending on a position is small, a large size of the capacitance forming portion may be secured.

Therefore, a high-capacitance multilayer ceramic capacitor may be implemented.

A description of the same features as those in the exemplary embodiment in the present disclosure described above will be omitted in order to avoid an overlapping description.

Hereinafter, the present disclosure will be described in detail through Experimental Examples, but the Experimental Examples are to help the specific understanding of the present disclosure. Therefore, the scope of the present disclosure is not limited thereto.

Experimental Example

According to the exemplary embodiment in the present disclosure, side margin portions according to the related art were formed in Comparative Examples and side margin portions including first and second regions in which contents of magnesium (Mg) were different from each other were prepared in Inventive Examples.

Further, ceramic green sheet laminates were formed by attaching side surface ceramic green sheets to electrode exposed portions of green chips to which internal electrodes were exposed without a margin in a width direction as in Comparative Examples and Inventive Examples, respectively.

The side surface ceramic green sheet was attached to both surfaces of each of the ceramic green sheet laminates by applying a predetermined temperature and pressure under the conditions at which deformation of the chip may be minimized, thereby manufacturing a multilayer ceramic capacitor green chip having a 0603 size (length×width×height: 0.6 mm×0.3 mm×0.3 mm).

A multilayer ceramic capacitor sample manufactured as described above was subjected to calcination at 400° C. or less under a nitrogen atmosphere and then sintered under the conditions of a sintering temperature of 1200° C. or less and a hydrogen ($H_2$) concentration of 0.5% or less. Then, an exterior defect and electrical properties such as insulation resistance and moisture resistance were comprehensively confirmed.

Figure 6:
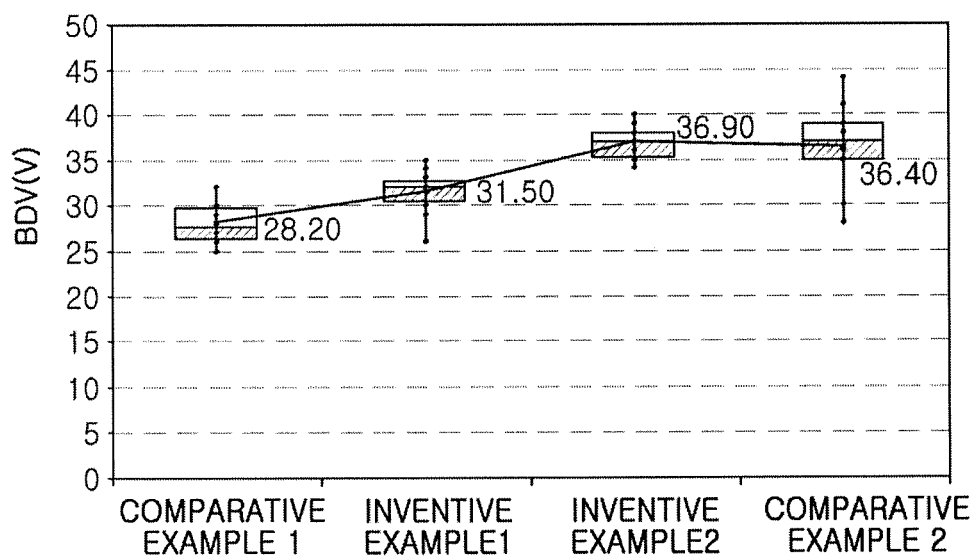
FIG. 6 is a graph illustrating results obtained by comparing breakdown voltages in Inventive Examples and Comparative Examples.

FIG. 6 is a graph illustrating results obtained by comparing breakdown voltages in Inventive Examples and Comparative Examples.

In FIG. 6, Comparative Example 1 corresponds to a case in which there was no difference in content of magnesium (Mg) contained in the side margin portion in a structure of a multilayer ceramic capacitor according to the related art, Inventive Examples 1 and 2 correspond to cases in which contents of magnesium (Mg) contained in second regions 112b and 113b of first and second side margin portions adjacent to first and second internal electrodes 121 and 122 were 10 moles and 30 moles, respectively, and Comparative Example 2 corresponds to a case in which the content of magnesium (Mg) contained in second regions 112b and 113b of first and second side margin portions 112 and 113 adjacent to first and second internal electrodes 121 and 122 was 50 moles.

It may be appreciated that in Inventive Examples 1 and 2, a breakdown voltage (BDV) was increased as compared to Comparative Example 1 corresponding to the multilayer ceramic capacitor according to the related art.

In Comparative Example 2, a breakdown voltage (BDV) was increased, but distribution thereof was non-uniform and distribution of moisture resistance reliability was also non-uniform. Therefore, in the present disclosure, the content of magnesium (Mg) contained in the second regions 112b and 113b of the first and second side margin portions 112 and 113 may be preferably 30 moles or less.

As set forth above, according to exemplary embodiments in the present disclosure, the breakdown voltage (BDV) may be increased and reliability may be improved by dividing each of the first and second side margin portions into the first region adjacent to the outer surface of the side margin portion and the second region adjacent to the internal electrodes exposed to the first and second surfaces of the ceramic body and adjusting the content of magnesium (Mg) contained in the second region to be larger than the content of magnesium (Mg) contained in the first region.

More specifically, the length of the oxide layer on the distal end of the internal electrode exposed to the side surface of the ceramic body in the width direction may be controlled by adjusting the content of magnesium (Mg) contained in the region of the side margin portion adjacent to the side surface of the ceramic body in the width direction, and thus, the breakdown voltage (BDV) may be increased and moisture resistance reliability may be improved.

Further, the density of the first region adjacent to the outer surface of the ceramic body may be increased by dividing each of the cover portions into the first region adjacent to the outer surface of the ceramic body and the second region adjacent to the internal electrode disposed in the outermost portion of the ceramic body among the plurality of internal electrodes and adjusting the content of magnesium (Mg) in the second region to be larger than that of magnesium (Mg) contained in the first region, such that moisture resistance reliability may be improved.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a ceramic body including dielectric layers and having first and second surfaces opposing each other, third and fourth surfaces connecting the first and second surfaces, and fifth and sixth surfaces connected to the first to fourth surfaces and opposing each other;
a plurality of internal electrodes disposed in the ceramic body, exposed to the first and second surfaces, and each having one end exposed to the third or fourth surface; and
a first side margin portion and a second side margin portion disposed on end portions of the internal electrodes exposed to the first and second surfaces, respectively,
wherein the ceramic body includes an active portion including the plurality of internal electrodes disposed to face each other with each of the dielectric layers interposed therebetween in a thickness direction and forming capacitance, and cover portions disposed on upper and lower surfaces of the active portion,
each of the cover portions is divided into a first region adjacent to an outer surface of the ceramic body and a second region adjacent to an internal electrode disposed in an outermost portion of the ceramic body among the plurality of internal electrodes, the first regions of the cover portions are respectively disposed on the second regions of the cover portions in the thickness direction,
contents of magnesium (Mg) contained in the second regions of the cover portions are larger than contents of magnesium (Mg) contained in the first regions of the cover portions, the contents of magnesium (Mg) in the first and second regions of the cover portions being greater than zero, and
side surfaces of the first and second regions of the cover portions are coplanar with the first and second surfaces of the ceramic body, respectively.

2. The multilayer ceramic capacitor of claim 1, wherein each of the contents of magnesium (Mg) in the second regions of the cover portions is 10 moles or more to 30 moles or less based on titanium (Ti) contained in the cover portions.

3. The multilayer ceramic capacitor of claim 1, wherein a ratio of a thickness of a region of the first or second side margin portion coming into contact with a distal end of the internal electrode disposed in the outermost portion of the ceramic body to a thickness of a region of the first or second side margin portion coming into contact with a distal end of an internal electrode disposed in a central portion of the ceramic body among the plurality of internal electrodes is 0.9 or more to 1.0 or less.

4. The multilayer ceramic capacitor of claim 1, wherein a ratio of a thickness of a region of the first or second side margin portion coming into contact with a corner of the ceramic body to a thickness of a region of the first or second side margin portion coming into contact with a distal end of an internal electrode disposed in a central portion of the ceramic body among the plurality of internal electrodes is 0.9 or more to 1.0 or less.

5. The multilayer ceramic capacitor of claim 1, wherein a thickness of each of the dielectric layers is 0.4 μm or less.

6. The multilayer ceramic capacitor of claim 1, wherein an average thickness of the first and second side margin portions is 2 μm or more to 10 μm or less.

7. The multilayer ceramic capacitor of claim 1, wherein each of the cover portions has a thickness of 20 μm or less.

8. The multilayer ceramic capacitor of claim 1, wherein to thickness of each of the plurality of internal electrodes is 0.4 μm or less.

9. The multilayer ceramic capacitor of claim 5, wherein a thickness of each of the plurality of internal electrodes is 0.4 μm or less.

10. The multilayer ceramic capacitor of claim 2, wherein a thickness of each of the dielectric layers is 0.4 μm or less.

11. A method of manufacturing a multilayer ceramic capacitor, the method comprising:
preparing a first ceramic green sheet on which a plurality of first internal electrode patterns are disposed to have a predetermined interval therebetween and a second ceramic green sheet on which a plurality of second internal electrode patterns are disposed to have a predetermined interval therebetween;
forming a ceramic green sheet laminate by stacking the first and second ceramic green sheets so that the plurality of first and second internal electrode patterns are alternated with each other;
cutting the ceramic green sheet laminate to have side surfaces to which distal ends of the plurality of first and second internal electrode patterns are exposed in a width direction;
forming a first side margin portion and a second side margin portion on the side surfaces of the ceramic green sheet laminate to which the distal ends of the plurality of first and second internal electrode patterns are exposed; and
preparing a ceramic body including dielectric layers and first and second internal electrodes by sintering the cut ceramic green sheet laminate,
wherein the ceramic body includes an active portion including the first and second internal electrodes disposed to face each other with each of the dielectric layers interposed therebetween in a thickness direction and forming capacitance, and cover portions disposed on upper and lower surfaces of the active portion,
each of the cover portions is divided into a first region adjacent to an outer surface of the ceramic body and a second region adjacent to an internal electrode disposed in an outermost portion of the ceramic body among the first and second internal electrodes, the first regions of the cover portions are respectively disposed on the second regions of the cover portions in the thickness direction,
contents of magnesium (Mg) contained in the second regions of the cover portions are larger than contents of magnesium (Mg) contained in the first regions of the cover portions, the contents of magnesium (Mg) in the first and second regions of the cover portions being greater than zero, and side surfaces of the first and second regions of the cover portions are coplanar with the first and second surfaces of the ceramic body, respectively.

12. The method of claim 11, wherein each of the contents of magnesium (Mg) in the second regions of the cover portions is 10 moles or more to 30 moles or less based on titanium (Ti) contained in the cover portions.

13. The method of claim 11, wherein a thickness of the first and second ceramic green sheets is 0.6 µm or less and a thickness of the first and second internal electrode patterns is 0.5 µm or less.

14. The method of claim 11, wherein a ratio of a thickness of a region of the first or second side margin portion coming into contact with a distal end of the internal electrode disposed in the outermost portion of the ceramic body to a thickness of a region of the first or second side margin portion coming into contact with a distal end of an internal electrode disposed in a central portion of the ceramic body among the first and second internal electrodes is 0.9 or more to 1.0 or less.

15. The method of claim 11, wherein a ratio of a thickness of a region of the first or second side margin portion coming into contact with a corner of the ceramic body to a thickness of a region of the first or second side margin portion coming into contact with a distal end of an internal electrode disposed in a central portion of the ceramic body among the first and second internal electrodes is 0.9 or more to 1.0 or less.

16. The method of claim 11, wherein an average thickness of the first and second side margin portions is 2 µm or more to 10 µm or less.

17. The method of claim 11, wherein a thickness of each of the plurality of internal electrodes is 0.4 µm or less.

18. A multilayer ceramic capacitor comprising:
a ceramic body including dielectric layers and having first and second surfaces opposing each other, third and fourth surfaces connecting the first and second surfaces, and fifth and sixth surfaces connected to the first to fourth surfaces and opposing each other;
a plurality of internal electrodes disposed in the ceramic body, exposed to the first and second surfaces, and each having one end exposed to the third or fourth surface; and
a first side margin portion and a second side margin portion disposed on end portions of the internal electrodes exposed to the first and second surfaces, respectively,
wherein the ceramic body includes an active portion including the plurality of internal electrodes disposed to face each other with each of the dielectric layers interposed therebetween and forming capacitance,
each of the first and second side margin portions is divided into a first region adjacent to an outer surface of the first and second side margin portions and a second region adjacent to the plurality of internal electrodes exposed to the first and second surfaces,
contents of magnesium (Mg) contained in the second region of the first and second side margin portions are larger than contents of magnesium (Mg) contained in the first regions of the first and second side margin portions, respectively, and
each of the contents of magnesium (Mg) in the second regions of the first and second side margin portions is 10 moles or more to 30 moles or less based on titanium (Ti) contained in the first and second side margin portions, respectively.

19. The multilayer ceramic capacitor of claim 18, wherein a ratio of a thickness of a region of the first or second side margin portion coming into contact with a distal end of the internal electrode disposed in the outermost portion of the ceramic body to a thickness of a region of the first or second side margin portion coming into contact with a distal end of an internal electrode disposed in a central portion of the ceramic body among the plurality of internal electrodes is 0.9 or more to 1.0 or less.

20. The multilayer ceramic capacitor of claim 18, wherein a thickness of each of the dielectric layers is 0.4 µm or less.

21. The multilayer ceramic capacitor of claim 18, wherein a width of the first regions of the first and second side margin portions is 12 µm or less and a width of the second regions thereof is 3 µm or less.

22. The multilayer ceramic capacitor of claim 18, wherein a thickness of each of the plurality of internal electrodes is 0.4 µm or less.

23. The multilayer ceramic capacitor of claim 20, wherein a thickness of each of the plurality of internal electrodes is 0.4 µm or less.

* * * * *